US009754222B2

(12) United States Patent
Brown et al.

(10) Patent No.: US 9,754,222 B2
(45) Date of Patent: Sep. 5, 2017

(54) METHOD FOR SUMMARIZED VIEWING OF LARGE NUMBERS OF PERFORMANCE METRICS WHILE RETAINING COGNIZANCE OF POTENTIALLY SIGNIFICANT DEVIATIONS

(71) Applicant: BULL HN INFORMATION SYSTEMS INC., Billerica, MA (US)

(72) Inventors: F. Michel Brown, Glendale, AZ (US); Steven G. Mehlberg, Star, ID (US); Russell W. Guenthner, Glendale, AZ (US)

(73) Assignee: BULL HN INFORMATION SYSTEMS INC., Billerica, MA (US)

( * ) Notice: Subject to any disclaimer, the term of this patent is extended or adjusted under 35 U.S.C. 154(b) by 135 days.

(21) Appl. No.: 14/132,180

(22) Filed: Dec. 18, 2013

(65) Prior Publication Data
US 2015/0169732 A1    Jun. 18, 2015

(51) Int. Cl.
G06F 17/30   (2006.01)
G06Q 10/00   (2012.01)

(52) U.S. Cl.
CPC .................................. *G06Q 10/00* (2013.01)

(58) Field of Classification Search
CPC ............... G06F 19/24; G06F 17/30705; G06F 17/3071; G06F 17/30598; G01S 5/0252; G01S 5/0278; G06K 9/6218; G06K 9/00536
See application file for complete search history.

(56) References Cited

U.S. PATENT DOCUMENTS

| | | | | |
|---|---|---|---|---|
| 6,397,166 | B1* | 5/2002 | Leung | G06K 9/6221 702/179 |
| 6,633,882 | B1* | 10/2003 | Fayyad | G06F 17/30592 707/999.006 |
| 7,349,914 | B1* | 3/2008 | Ordonez | G06K 9/6223 707/999.101 |
| 2003/0120630 | A1* | 6/2003 | Tunkelang | G06F 17/3071 |
| 2003/0212520 | A1* | 11/2003 | Campos | G06F 17/30601 702/101 |

* cited by examiner

*Primary Examiner* — Yuk Ting Choi
(74) *Attorney, Agent, or Firm* — Pillsbury Winthrop Shaw Pittman LLP (57) ABSTRACT

A method is disclosed for determining with computing apparatus an adequate number of clusters for summarizing result data that includes a large number of observation data points. The summary data includes a small number of samples of data from each cluster with the number of clusters being large enough to provide a good summary of all the result data without being so large as to make it difficult for one skilled in the art to examine visually all of the summary data generated by the computing apparatus.

9 Claims, 6 Drawing Sheets

FIG. 1-A Scatter Plot of 1,000,000 Data Points
Created as 5 groups (k=5) shown grouped as *4 groups*

FIG. 1-B Scatter Plot of 1,000,000 Data Points
Created as 5 groups (k=5) shown grouped as 5 *groups*

FIG. 1-C Scatter Plot of 1,000,000 Data Points
Created as 5 groups (k=5) shown grouped as *6 groups*

Example grouping results:

K is the number of groups;

Quality Indicator (QI) is average distance from centroid of the group for all data points

| K | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Quality Indicator | 867.3 | 410.8 | 166.5 | 71.8 | <u>15.9</u> | 14.7 | 13.4 | 12.2 | 10.9 | 9.1 | 8.6 | 8.1 | 7.5 | 7.0 | 6.7 | 6.4 | 6.1 | 5.8 | 5.5 | |

Note that K (number of groups) of 5 is a desirable number of summary groups in that the Quality Indicator is improving rapidly from 1 to 5 groups, but stops improving very much after 5 groups (from 6 to 20)

METHOD FOR SUMMARIZED VIEWING OF LARGE NUMBERS OF PERFORMANCE METRICS WHILE RETAINING COGNIZANCE OF POTENTIALLY SIGNIFICANT DEVIATIONS

This application claims priority to a U.S. Provisional Patent Application 61/739,498 filed Dec. 19, 2012 titled "METHOD FOR SUMMARIZED VIEWING OF LARGE NUMBERS OF PERFORMANCE METRICS WHILE RETAINING COGNIZANCE OF POTENTIALLY SIGNIFICANT DEVIATIONS" with first named inventor F. Michel Brown, Glendale, Ariz. (US), which is expressly incorporated herein as though set forth in full.

CROSS REFERENCE TO RELATED APPLICATIONS

REFERENCE TO U.S. PROVISIONAL PATENT APPLICATION 61/739,498 FILED Dec. 19, 2012

STATEMENT REGARDING FEDERALLY SPONSORED RESEARCH OR DEVELOPMENT

None

THE NAMES OF PARTIES TO A JOINT RESEARCH AGREEMENT

None

INCORPORATION BY REFERENCE OF MATERIAL SUBMITTED ON A COMPACT DISC

None

BACKGROUND OF THE INVENTION

Modern computer systems, especially High Performance Computer (HPC) systems, are incorporating more and more processors or processor cores that can be applied to solving complex problems. Utilization of many hundreds or thousands or even millions of cores requires tools for determining or visualizing where processing resources are being utilized or poorly utilized. High Performance Computing systems utilize parallel programming which dispatches processing over these many, many processors running many, many threads. It is also typically necessary to establish synchronization points for coordination and control of data being processed by these many threads.

It is also typical that trying to analyze performance data from a large plurality of threads or processes becomes so complex that approaches used in the past for analyzing performance from a single or small number of processors or processes or threads are not found to be useful. The users of performance visualization or analysis tools need a way to reduce the number of process's data they must analyze to understand HPC application performance. It becomes desirable to reduce the number of data sets from hundreds or even millions of sets of data to a few.

BRIEF SUMMARY OF THE INVENTION

According to the teachings of the present invention, certain inadequacies of the prior art are overcome by providing a machine process or method for reducing hundreds, thousands, or millions of data items into a small number of representative groups or clusters of data, the data items assigned to groups such that similar data items are assigned to common groups, and data items which are somehow "unusual" are assigned to other groups. The method of the present invention provides the ability to examine the characteristics of an overall group by looking at one or a small number of items from each group, without having to look at large number of data items. It is of paramount importance however that the number of groups be somewhat limited, but still be large enough that "unusual" data items are not placed into large groups where they might be left unnoticed. It is also important to determine the number of groups in a manner that keeps the number of groups small enough to be examined, but with the number large enough to provide enough groups such that unusual data items are not hidden within a too small number of groups.

For example, in examining data for very large number of HPC processes, the reduction of data that is to be viewed must be done without hiding a few processes that are different than the rest, because processes that are performing quite differently than the rest may very well be the most important ones needed to be examined in order to improve overall application performance. It would therefore be an improvement if HPC process measurement metrics collected from each process could be grouped into sets, thus reducing the number of group (or cluster) representatives that an analyst must study to draw conclusions about the process. Then, instead of having to look at thousands to millions of processes, the analyst need only look at a few group representatives.

An efficient grouping mechanism, K-Means, is well known in the art and can be used in an embodiment of the method of the present invention. Other grouping methods such as "K-Means++" and "scalable K-Means" or other grouping methods can also be used. The K-Means++ algorithm is expected to find a better set of groups with less processing time, and the scalable K-Means provides for better utilizing parallelization.

The K-Means algorithm is described in the online web resource Wikipedia at web address "http://en.wikipedia.org/wiki/K-Means_clustering" as follows.

"In data mining, K-Means clustering is a method of cluster analysis which aims to partition n observations into k clusters in which each observation belongs to the cluster with the nearest mean. This results in a partitioning of the data space into Voronoi cells. The problem is computationally difficult (NP-hard), however there are efficient heuristic algorithms that are commonly employed and converge quickly to a local optimum. These are usually similar to the expectation-maximization algorithm for mixtures of Gaussian distributions via an iterative refinement approach employed by both algorithms. Additionally, they both use cluster centers to model the data, however K-Means clustering tends to find clusters of comparable spatial extent, while the expectation-maximization mechanism allows clusters to have different shapes".

The K-Means++ algorithm is also described in Wikipedia at web address "http://en.wikipedia.org/wiki/K-Means++" as follows.

"In data mining, K-Means++ is an algorithm for choosing the initial values (or "seeds") for the K-Means clustering algorithm. It was proposed in 2007 by David Arthur and Sergei Vassilvitskii, as an approximation algorithm for the NP-hard K-Means problem—a way of avoiding the sometimes poor clusterings found by the standard K-Means algorithm. It is similar to the first of three seeding methods proposed, in independent work, in 2006 by Rafail Ostrovsky, Yuval Rabani, Leonard Schulman and Chaitanya Swamy. (The distribution of the first seed is different.)."

The "scalable K-Means++" algorithm referenced above is described in a paper by Bahman Bahmani, Stanford University et. al. at the 38th International Conference on Very Large Data Bases, Aug. 27 thru the 31, 2012, Istanbul, Turkey and published in the Proceedings of the VLDB Endowment, Vol. 5, No. 7. A copy of that paper is provided in Appendix A.

Once a grouping algorithm is chosen, it is of benefit then to choose a number of groups into which to divide the sets of process data. Both the K-Means and the K-Means++ algorithms require the number of groups to be provided as an input. In some cases the analyst will have a specific expectation, but in most new situations an analyst will not know and may not even have any expectations or any idea of what might be a good number of groups. Therefore, the ability to automatically compute/calculate and provide an optimum or nearly optimum number of groups (Auto-Grouping) is desirable.

An Auto-Group approach that is calculated or computed rather than provided by a user of a visualization tool is important because the number is chosen based on analysis of the data rather than as a preconceived number or simply a guess by the user. In order to choose a number of groups, it is first beneficial to provide a process membership for any given number of groups and to provide calculation of a quality indicator for each set of groups. In one embodiment of the method of the present invention, a quality indicator that is both simple and which has worked well in experimental use corresponds to the average distance of each metric (point) from its group's centroid. In these examples, the smaller this quality indicator is, the better the grouping. (Other quality indicators might be just the opposite where larger is better).

In another embodiment of the method of the present invention, a quality indicator that provides potentially better attention to data points which are unusual, or further from the centroid of metrics for a group is a quality indicator which is related to the maximum distance of any member of a group to the centroid of the group. The idea being to try not to miss examination of any data points which are unusual and/or outlying from the others in some respect.

In another embodiment of the method of the present invention, more than one metric is calculated, and the quality indicator is made a function of a plurality of metrics. For example, if several metrics are identified for a group, a quality indicator which defines or corresponds to a relative maximum distance from the centroid for all the metrics (with appropriate scaling) would provide an advantage towards not "hiding" or missing data points that might have something unusual about them.

Other types of quality indicators can also be utilized or devised by those skilled in the art.

A basic nature of the average distance from the centroid is to tend toward becoming smaller as the number of groups is increased. Therefore if a heuristic search is conducted by starting at a large number of groups and going or moving toward a smaller number of groups looking for an improvement (e.g. in performance), it would tend to find one rather early in the search, but probably not the optimum one. It is also preferable to have a smaller number of groups chosen or selected to reduce the number of group representatives to analyze. Therefore, the chosen search approach is to start with only one group and then to increase the number of groups at each additional or further step. In experimental use it was noted that the quality indicator typically decreases more gradually as search k increases. A basic test to determine or calculate when the optimum number of groups is reached is to compare the quality indicator for N groups to the quality indicator for N+1 groups and stop when the quality indicator for N groups has a value that is less than that for N+1 groups. However, because the quality indicator (for these examples) typically naturally decreases as search k increases, the comparison may optionally also take into account second order results, or to heuristically pick a fixed number for comparing a Quality Indicator for N compared to a Quality Indicator for N+1. In practice, it has been found that choice of a constant number in the range of 1.3 has given good results with experimental data. That is, the method should perform a comparison of a quality indicator for N with 1.30 times the quality indicator for N+1. When the search stops, N is the chosen number of groups.

It must be noted that at least a few, maybe three or four groupings must be made to get over any start-up anomalies which may be typical. That is, it may be at least optionally desirable to require the grouping algorithm to always choose at least some reasonably small number of groups. This number can be optionally specified by the user, possibly after getting some experience in looking at specific results or types of data.

An alternative and potentially improved approach according to another embodiment of the method of the present invention is to use "second order" calculations where the distance from the centroid is saved or calculated for at least three numbers of groups and then the resulting number of groups for examination is chosen based upon a change in the amount of change as one goes or moves from N to N+1, to N+2. The choice of an algorithm or method for examining second order effects and using those in consideration of choosing a number of groups could be devised by one knowledgeable in the art of mathematics and/or computer programming.

Another alternative according to still another embodiment of the method of the present invention is to display values corresponding to the average distance from the centroid, optionally as a graph, to a user of a grouping tool and then based upon characteristics of the "curve", the user could be given or provide input as to the choice, or at least given the option of picking the result number of groups.

It is also beneficial to limit the maximum number of groups analyzed to a size that can be reasonably examined by a user of the visualization tool such as the group number 20, regardless of the sample size. The limit on the number of groups can also be chosen by the user. An optional limit is beneficial to avoid a search for a number of groups where the number of groups grows very large without finding a solution (i.e. one based on the chosen parameters).

Once a process measurement metric for each process is grouped, then according to the method of the present invention, a group representative is chosen for each group. Choices that might be considered are: the minimum value in a group, the maximum value in a group, the average of all members of a group, the value of the member closest to the centroid of a group, or other such representative choices as might be determined by one skilled in the art.

Because of the known usefulness of the K-Means based algorithms, it is important in this description of the grouping innovation that the K-Means++ algorithm be presented. In the following discussion of K-Means and K-Means++, instead of groups the K-Means terminology of data-clusters is used. The K-Means++ algorithm was originally presented and discussed by David Arthur and Sergei Vassilvitskii in their paper titled "K-Means++: The advantages of careful seeding" which is available at world wide web (internet) address: "http://ilpubs.stanford.edu:8090/778/1/2006-13.pdf".

The K-Means method is a widely used clustering technique that seeks to minimize the average squared distance between points in the same cluster. A typical description of steps based on a K-Means algorithm is as follows:

1) Place K points into the space represented by the objects that are being clustered. These points represent initial group centroids.
2) Assign each object to the group that has the closest centroid.
3) When all objects have been assigned, recalculate the positions of the K centroids.
4) Repeat Steps 2 and 3 until the centroids no longer move. This produces a separation of the objects into groups from which the metric to be minimized can be calculated or computed.

The K-Means++ algorithm is as follows:

1) Choose one centroid uniformly at random from among the data points.
2) For each data point x, compute D(x), the distance between x and the nearest centroid that has already been chosen.
3) Add one new data point at random as a new centroid, using a weighted probability distribution where a point x is chosen with probability proportional to D(x)2.
4) Repeat Steps 2 and 3 until K centroids have been chosen.
5) Now after the initial centroids have been chosen, proceed using standard K-Means clustering.

David Arthur provided software to illustrate the K-Means++ algorithm that includes functionality to generate grouped data so that users can see how the K-Means++ algorithm works. This eases the task of evaluation of the Auto-Grouping algorithm described above. Arthur's test mechanism provides the following two controlling parameters beyond the number of groups and the total number of points to group:

1) Standard deviation of the centroid distribution, called R, and
2) Standard deviation of the group distribution, called r.

The standard deviations allow looking at cases where a group's membership is distinct from another group and where it is not.

As an example from experimental use results where a group membership is distinct are shown below. The grouping parameters chosen were:

1) Number of groups created is 5
2) Number of data points grouped is 1,000,000
3) R is 1000
4) r is 20

Figure 3:
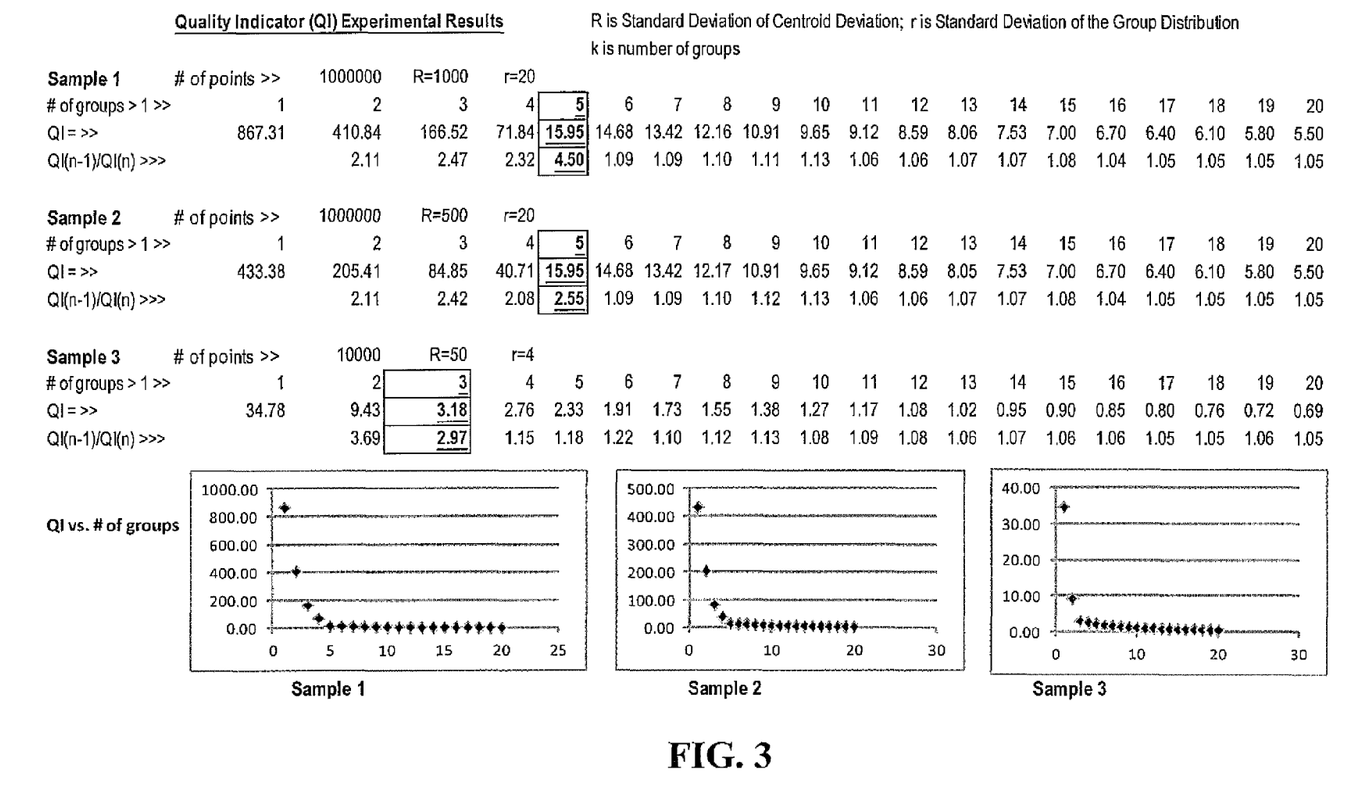
FIG. 3 illustrates experimental results obtained from application of an illustrated embodiment of the present invention; and, FIG. 4 provides illustration in flow chart form of at least one illustrated embodiment of the method of the present invention performed by computing apparatus.

The following excerpt from a resultant experimental spreadsheet having two rows is shown in FIG. 3. In this FIG. 3, the first row is the search number of groups (K) to create, and the second row is the grouping quality indicator.

It can be observed in FIG. 3 that as the search number of groups increases, the grouping quality indicator decreases from 867.3 for k of 1 to 15.9 for k of 5. The quality indicator for k of 6 decreases by a small factor of 1.09 to 14.7. The search algorithm thus picks the Auto-Group value of 5, which matches the number of groups created.

Figure 1:
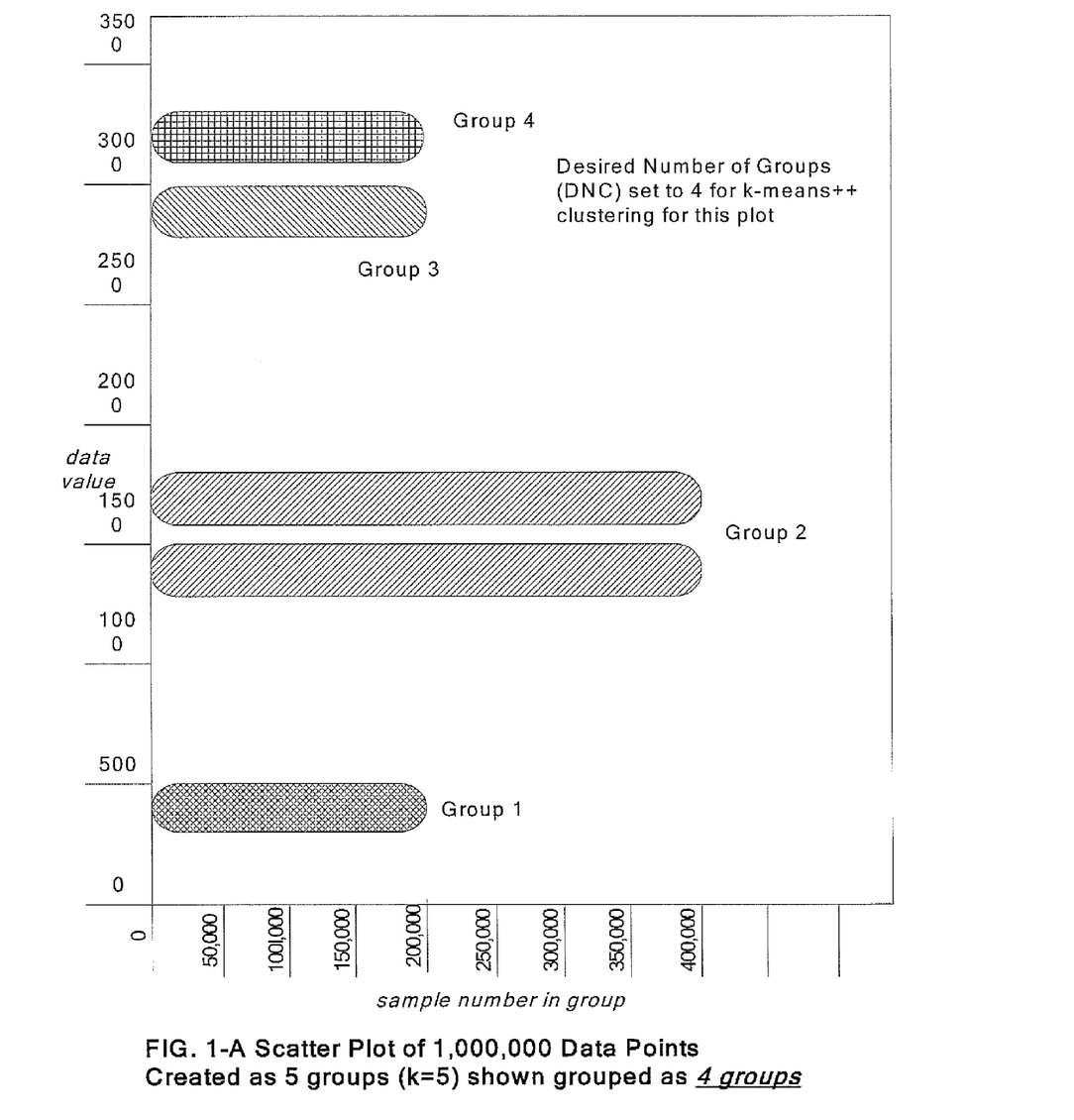

It is helpful in understanding the above example to see the underlying data. FIGS. 1-A, 1-B, and 1-C provide plots of this exemplary data for searches with k having values of 4, 5, and 6. The x-axis describes the sample number in the group and the y-axis describes the data value.

BRIEF DESCRIPTION OF THE SEVERAL VIEWS OF THE DRAWINGS

The subject matter of the method of the present invention is particularly pointed out and distinctly claimed in the concluding portion of the specification. The invention, however, both as to organization and method of operation, may better be understood by reference to the following description taken in conjunction with the subjoined claims and the accompanying drawing in which:

FIGS. 1-A, 1-B, and 1-C illustrate exemplary results from a computing mechanism programmed to perform the steps of one illustrated embodiment of the present invention on sample data obtained from an automated data generation program;

DETAILED DESCRIPTION OF THE INVENTION

The above is an overview of several illustrated embodiments implementing the machine method of the present invention and provides exemplary translation examples utilizing selected aspects described in connection with certain embodiments of the present invention.

FIGS. 1-A, 1-B, and 1-C provide illustration of applying the K-Means++ algorithm to sample data generated using the David Arthur software.

FIGS. 1-A, 1-B, and 1-C illustrate setting the desired number of clusters (groups) as input to the K-Means++ algorithm to 4, 5, and 6 respectively. The y-axis is the data values for the data points and the x-axis is the number of data points placed into each cluster by application of the K-Means++ algorithm with the desired number of groups. The cross-hatching of each group indicates to which cluster the data points have been assigned by the K-Means++ clustering. Examination and comparison of FIGS. 1-A, 1-B, and 1-C will give an idea of how the K-Means++ algorithm works.

Figure 2:
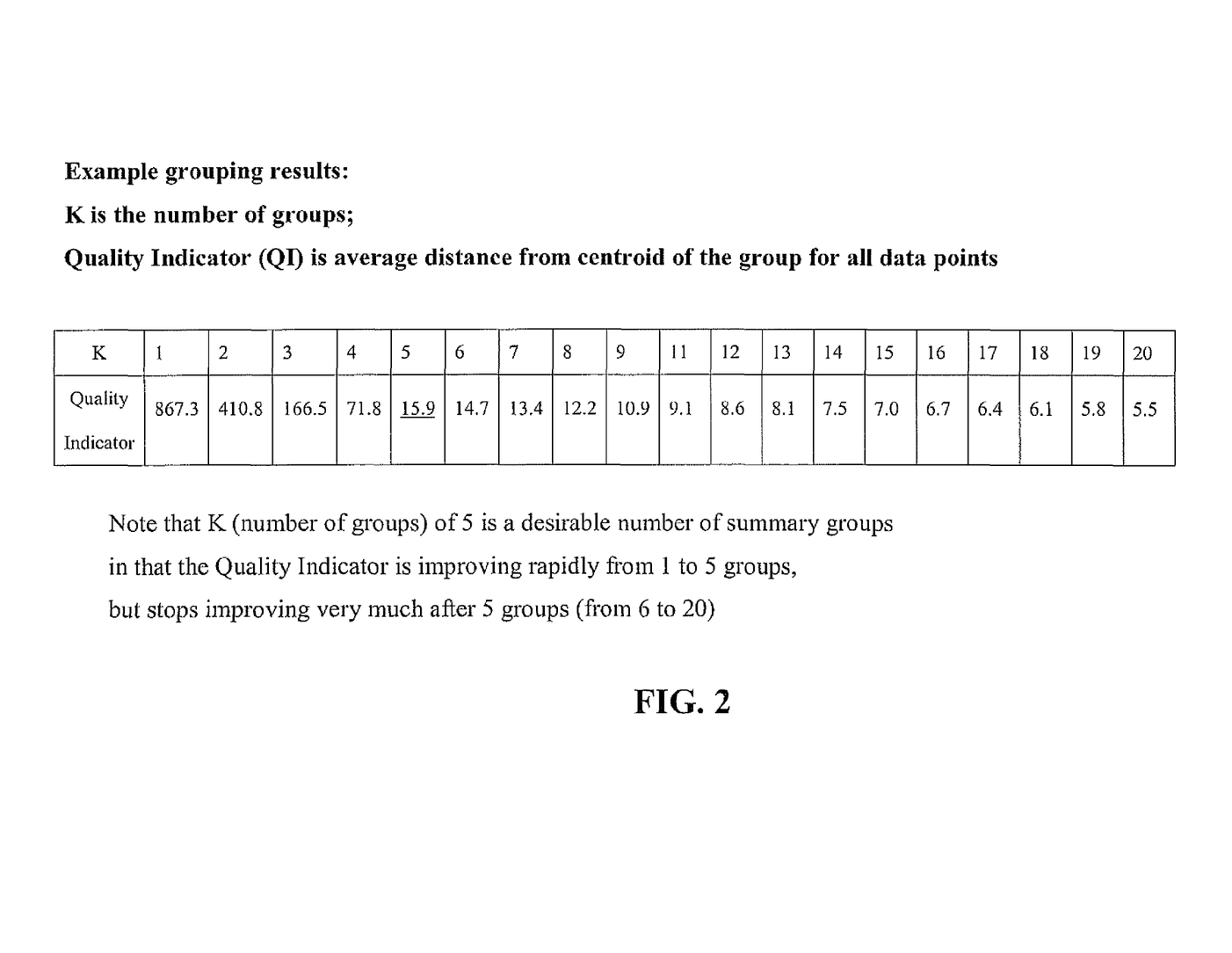
FIG. 2 illustrates exemplary results of the same data from FIGS. 1-A through 1-C showing the value of a Quality Indicator relative to the number of groups chosen for input to the K-Means++ clustering mechanism, varying the number of groups chosen from 1 to 20.

FIG. 2 provides illustration of the experimental results shown in FIGS. 1-A, 1-B, and 1-C with a "Quality Indicator" calculated or computed for a desired grouping of one to twenty groups (clusters). That is, FIGS. 1-A, 1-B, and 1-C illustrate only desired number of clusters of 4, 5, and 6. Examining the value of the Quality Indicator as K (number of desired groups or clusters) varies from 1 to 20 shows that the Quality indicator goes down rapidly as K increases from 1 to 5, and then improves less rapidly from 6 to 20. It will be noted that in this example a "lower" quality indicator is better. That is, since in this illustration the quality indicator is the average distance from the centroid of each group for all data in all groups, therefore the lower the number the better the grouping. In this example choosing a number of groups, and then choosing a small sample of representative data from each of these five groups to be examined will likely provide a good overview of all the data, without missing any exceptional data. Note that instead of using an average distance from the centroid as a quality indicator, it may be advantageous to use or select a maximum distance to try to be sure that "outlying" data points are not missed in the summary. It may also be advantageous to choose a few or the "most" outlying points in each cluster for further examination as sample data to be sure that exceptional data is not missed.

Figure 4:
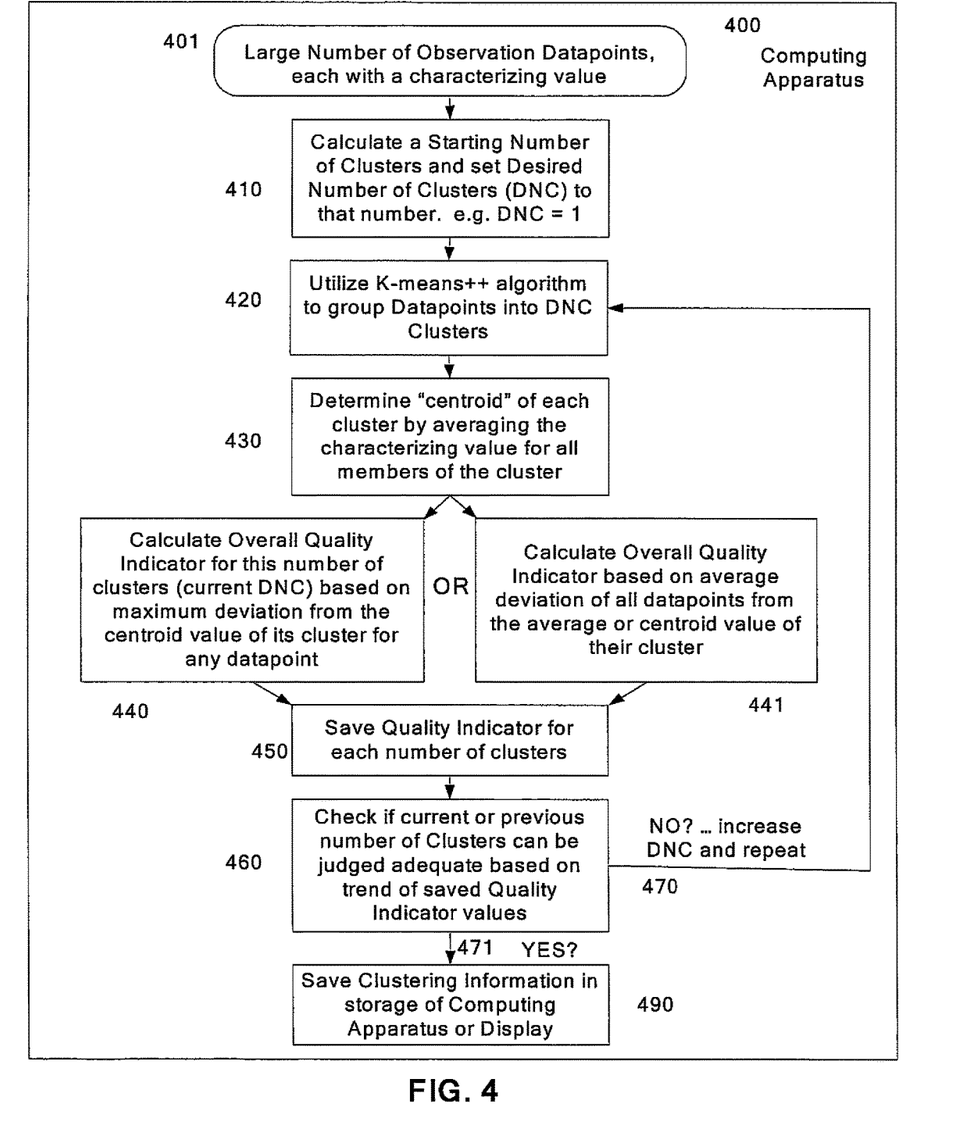

FIG. 4 provides illustration of the operational flow performed by a computing apparatus 400 controlled by a control program stored within storage of the computing apparatus according to one illustrated embodiment of the method of the present invention. The method providing for summarized viewing of a large number of observation data points (as indicated by reference numeral 401) each having a characterizing value. The observation data points each have a characterizing value stored in memory or storage of the computing apparatus, or as records on a file or in memory of the computing apparatus. The clustering begins (as indicated by reference numeral 410) by selecting a starting number of desired number of clusters (DNC), which might typically be one (just to get started) or two or more, or possibly some starting number based upon user input or a calculation based on the number of data points. The K-Means++ algorithm (or other clustering algorithm) is then applied (as indicated by reference numeral 420) to the observation data points for achieving a first clustering. A quality indicator value, or indication of goodness of the current number of clusters is then calculated or computed by the computing apparatus (as indicated by reference numerals 430 and 440 or 441). The quality indicator value can be based, for example, on the "distance" of the characterizing values of each data point compared to the "average" or "centroid" of all data points in that cluster. The quality indicator could be computed or calculated in other ways as could be determined by those skilled in the art, and this described illustration of quality indicator is not meant to be limiting. For each number of clusters, the Quality Indicator is calculated and saved (in storage of the computing apparatus). After a few Quality Indicators have been calculated by the computing apparatus, the pattern of change as the number of clusters is increasing can then be observed (displayed) (as indicated by reference numeral 460) for determining if any further increase in the number of clusters is likely to produce much improved values of the overall quality indicator, or not. If the number of clusters is determined to be not yet large enough (as indicated by reference numeral 470), then the desired number of clusters is further increased and everything (all the above described steps) is repeated by the computing apparatus. If the quality indicator improvement seems to be leveling off (as indicated by reference numeral 471) then the repeated clustering can be stopped.

Once the proper number of clusters is determined, the clustering information can optionally be saved 490 to a file or storage of the computing apparatus, or displayed on a computer screen for further use in evaluating the data.

It is important to note also that one may want to go beyond any first indication of slowing improvement in the quality indicator, especially at the beginning, to avoid any local minimums or anomalies in starting up the clustering with low numbers of clusters. These problems and solutions are well known in the art of clustering and alterations to the algorithm while still applying principles of the present invention can be made. It is further noted that the order of the steps in the claimed invention may be altered without changing the concept of the invention, and the order of the steps is not meant to be limiting.

Thus, while the principles of the invention have been made clear and described relative to a number of embodiments or implementations, it will be immediately obvious to those skilled in the art the many modifications or adaptations which can be made without departing from those principles. While the invention has been shown and described with reference to specific illustrated embodiments, it should be understood by those skilled in the art that various changes in form and detail may be made such implementations without departing from the spirit and scope of the invention as defined by the following claims.

Having described the embodiments of the present invention, it will now become apparent to one of skill in the arts that other embodiments or implementations incorporating the teachings of the present invention may be used. Accordingly, these embodiments should not be construed as being limited to the disclosed embodiments or implementations but rather should be limited only by the spirit and scope of the following claims.

What is claimed is:

1. A computer-implemented, comprising:
A) determining, by a computing apparatus, an adequate number of clusters for summarizing result data which includes a large number of observation data points each having at least one characterizing value;
B) utilizing, by the computer apparatus, a clustering algorithm to examine a significant plurality of the large number of observation data points, the clustering algorithm allowing for one or more input information parameters including at least a designation of a specified number of clusters that provide to the clustering algorithm the number of clusters into which the results data are to be divided;
C) storing the observation data points with characterizing values in a memory storage device of the computing apparatus;
D) setting the specified number of clusters for the clustering algorithm to be performed by the computing apparatus to a value designating a starting number clusters;
E) clustering the significant plurality of the large number of observation data points into the specified number of clusters utilizing the clustering algorithm performed by the computing apparatus to obtain a specific clustering of the data points for that specified number of clusters such that each of the plurality of the large number of observation data points is a member of one cluster;
F) computing by the computing apparatus, a quality indicator for the specific clustering of the data points from step E), the quality indicator being based on a maximum deviation of a characterizing value of any member of the cluster when compared to a typical value corresponding to a centroid characterizing value of at least a majority of other members of the cluster;
G) storing the quality indicator value and the specified number of clusters for the specific clustering of the data points related to the that specified number of clusters into the memory storage device; and
H) increasing the specified number of clusters and then repeating steps E) through G) two or more times until a preset limit on the specified number of clusters is detected by the computing apparatus or until the computer apparatus makes a selection of one of the already specified number of clusters as the adequate number of clusters based on a pattern of at least two of the already computed quality indicators.

2. The method of claim 1 in which the starting number of clusters is determined the computer apparatus performing a selection of one or more of the following: a) setting the starting number of clusters to a predetermined starting number of clusters, b) setting the starting number of clusters to a value obtained from an input value entered by a user, c) setting the starting number of clusters to value of one, or d) setting the starting number of clusters to a value calculated based on a count of the large number of observation data points.

3. The method of claim 1 in which the starting number of clusters is one or two.

4. The method of claim 1 in which the starting number of clusters is specified by a user of the method as one of the input information parameters.

5. The method of claim 1 in which a minimum number of clusters is specified by a user of the method as one of the input information parameters.

6. The method of claim 1 in which the increasing of the number of clusters is an increasing of the specified number of clusters by one.

7. The method of claim 1 in which the computing apparatus performing the repeating of the steps E) through G) and the increasing of the number of clusters is limited so as to stop upon detecting having reached a predetermined limit on the specified number of clusters.

8. The method of claim 1 in which the step of increasing of the number of clusters is limited so as to stop upon having reached a limit which is based on a count of the large number of observation data points performed by the computing apparatus.

9. The method of claim 1 in which the clustering of step C) performed by the computing apparatus utilizes an algorithm based upon K-Means, K-Means++, or scalable K-Means algorithms.

* * * * *